United States Patent [19]

Haraikawa et al.

[11] 4,390,084
[45] Jun. 28, 1983

[54] MECHANICAL DISC BRAKE

[75] Inventors: Tetsuo Haraikawa, Funabashi; Koichi Tamura, Tokyo, both of Japan

[73] Assignee: Tokico Ltd., Kawasaki, Japan

[21] Appl. No.: 233,077

[22] Filed: Feb. 9, 1981

[30] Foreign Application Priority Data

Feb. 18, 1980 [JP] Japan .................................. 55-18805

[51] Int. Cl.³ ............................................ F16D 65/38
[52] U.S. Cl. .................... 188/71.7; 188/72.3; 188/72.7; 188/196 M; 188/196 V
[58] Field of Search ............... 188/71.7, 71.8, 71.9, 188/72.3, 72.6, 72.8, 72.7, 216, 196 M, 196 V, 196 BA, 196 B; 267/177, 179, 170, 155, 154, 167, 166

[56] References Cited

U.S. PATENT DOCUMENTS

| 2,042,248 | 5/1936 | Charter et al. | 267/155 X |
| 2,728,188 | 12/1955 | Hettich | 267/155 X |
| 3,701,400 | 10/1972 | Burnett et al. | 188/72.8 X |
| 4,088,204 | 5/1978 | Haraikawa | 188/71.7 |
| 4,162,720 | 7/1979 | Haraikawa | 188/71.9 |
| 4,284,176 | 8/1981 | Haraikawa et al. | 188/71.7 |

Primary Examiner—Douglas C. Butler

Attorney, Agent, or Firm—Wenderoth, Lind & Ponack

[57] ABSTRACT

A mechanical disc brake, including a caliper supported on a stationary member to slide in the direction of the axis of rotation of a rotatable disc and straddling the circumference of the disc to define two limb portions on the opposite sides of the disc, a first friction pad being pressed against one surface of the disc by one of the limb portions, a second friction pad disposed so as to be opposed to the first friction pad and being pressed against another surface of the disc, a force converting mechanism provided in the other limb portion of the caliper for converting the rotation of a lever to thrust force pressing the second friction pad, a rod extending in the direction of the axis of the disc and threadingly engaging the force converting mechanism with one end thereof engaging the second friction pad, a spring retainer threadingly engaging the other end of the rod, and a coil spring acting between the spring retainer and the other limb portion of the caliper to bias the rod in the direction separating from the second friction pad. A projection is provided on the spring retainer for abutting in the circumferential direction one end of the coil spring, thereby controlling the rotation of the spring retainer with respect to the rod.

5 Claims, 5 Drawing Figures

MECHANICAL DISC BRAKE

BACKGROUND OF THE INVENTION

This invention relates to mechanical disc brakes and, particularly to mechanical disc brakes of a floating caliper type having an adjusting mechanism for compensating for wear of friction pads as shown, for example, in U.S. Pat. Nos. 4,088,204 and 4,162,720.

Conventional mechanical disc brakes comprise a force converting mechanism converting rotational input force applied through a cable associated with a brake pedal or a brake lever into a linear thrust force which is applied to one of two opposing friction pads. The mechanism usually comprises a lever connected to the cable, a nut integrally connected to the lever, a ramp plate having an inclined groove, and a ball interposed between the nut and the ramp plate and engaging with the inclined groove. A rod engages with the nut and abuts with the one friction pad. When the nut is rotated by the lever, the nut is displaced in the axial direction with respect to the ramp plate; the displacement of the nut is transmitted to the one friction pad through the rod; and the reaction force is transmitted to the other opposing friction pad through the caliper, thereby clamping the disc between the friction pads. When the force applied through the cable is released the rod retracts by a return spring.

The screw-thread engagement between the rod and the nut constitutes the adjusting mechanism for compensating for the wear of the friction pads. By threadingly rotating the rod with respect to the nut and toward the friction pad, the wear of the friction pads can be compensated for.

The relative rotation of the nut and the rod can be effected manually or automatically. For automatic adjusting, a ratchet mechanism is provided between the nut and the rod.

The relative rotation between the nut and the rod must be prevented for maintaining the adjusted position. It is possible to maintain the adjusted relative position between the nut and the rod by increasing the frictional resistance in the screw-threads between the nut and the rod. However, there is usually provided for this purpose a rotation control member between the rod and the nut or between the rod and the caliper.

It is necessary to prevent the change in the spring force of the return spring which would be caused by such effects as vibrations; and further, it is required to maintain the spring force of the return spring constant irrespective of the relative displacement of the rod with respect to the nut.

DESCRIPTION OF THE PRIOR ART

The present invention relates to improvements in the disc brake disclosed in Japanese patent application No. 53-101130 applied on Aug. 19, 1978 and disclosed on Feb. 27, 1980, corresponding to the embodiment disclosed in FIG. 9 of U.S. patent application Ser. No. 68,106, filed on Aug. 20, 1979, now U.S. Pat. No. 4,284,176, issued Aug. 18, 1981, or German patent application No. 2933469.8 filed on Aug. 17, 1979, and invented by the inventors of this application.

SUMMARY OF THE INVENTION

An object of the invention is to satisfy the requirements aforementioned with a simple construction which is easy in assembly and maintenance operations.

The disc brake according to the invention is of the kind including a caliper supported on a stationary member to slide in the direction of the axis of rotation of a rotatable disc and straddling the circumference of the disc to define two limb portions on the opposite sides of the disc, a first friction pad being pressed against one surface of the disc by one of the limb portions of the caliper, a second friction pad disposed so as to oppose the first friction pad, a force converting mechanism provided in the other limb portion of the caliper for converting a rotational force applied on a lever to a thrust force acting in the direction of the axis of the disc, a rod screw-threadingly engaging the force converting mechanism with one end abutting the second friction pad, a spring retainer screw-threadingly engaging the other end of the rod, and a coil spring acting on the spring retainer for biassing the rod in the direction away from the second friction pad. The present invention is characterized in that a projection is provided on the seating surface of the spring retainer with which one end of the coil spring engages. The projection abuts in the circumferential direction with the coil spring, thereby controlling the rotation of the spring retainer with respect to the rod.

BRIEF DESCRIPTION OF THE DRAWINGS

The invention will now be explained in detail with reference to accompanying drawings exemplifying a preferred embodiment of the invention, in which.

DETAILED DESCRIPTION OF THE PREFERRED EMBODIMENT

Figure 1:
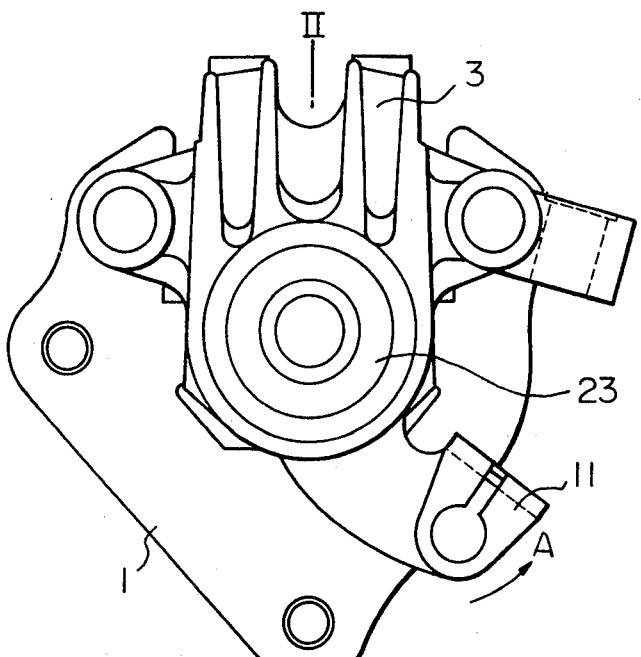
FIG. 1 is a front view of a disc brake according to the invention.

The disc brake illustrated in the drawings comprises a stationary member 1 adapted to be secured to a non-rotatable part of a vehicle (not shown), a caliper 3 slidably mounted on the stationary member 1 in the direction of the axis of rotation of a rotatable disc 2 and straddling the circumference of the disc 2 to define two limb portions 3a and 3b, a first friction pad 4 having a backing plate 4a and a second friction pad 5 having a backing plate 5a. The backing plate 4a of the first friction pad 4 engages one of the limb portions 3a of the caliper. There is provided in the other limb portion 3b of the caliper an axial opening consisting of a recess 6 opening towards the second friction pad 5, an annular wall 7 and a recess 8. The recess 8 has an open outer end 9 which is closed by a cap 23 and a seal 26. The recess 6 receives therein a force converting mechanism consisting of a ramp plate 10 non-rotatably mounted on the inner side of the annular wall 7, a nut 12 integrally connected to a lever 11 to which a cable (not shown) associated with a brake pedal or a brake lever (not shown) is connected, and at least one, preferably three circumferentially spaced balls 15. There are provided in opposing surfaces of the ramp plate 10 and the nut 12 respectively circumferentially extending grooves 13 and 14 with the axial depth of each changing gradually in the circumferential direction. The balls 15 are received in the respective pair of grooves 13 and 14; thus, when the nut 12 and the ramp plate 10 are rotated respective to each other, the axial distance therebetween changes gradually.

One end portion 16a of a rod 16 screw-threadingly engages with screw-threads 12a of the nut 12, and the inner end of the rod 16 abuts the backing plate 5a of the second friction pad 5. The rod 16 extends axially through the ramp plate 10 and the annular wall 7 and into the recess 8. The other end portion 16b of the rod 16 screw-threadingly engages the screw-threads 17a of a spring retainer 17. A coil spring 19 acting as a return spring engages the spring retainer 17 to bias the rod 16 in the outward direction, that is, in the direction away from the friction pad 5. The screw-threads provided on the opposite end portion 16a and 16b of the rod 16 have the same pitch.

Figure 2:
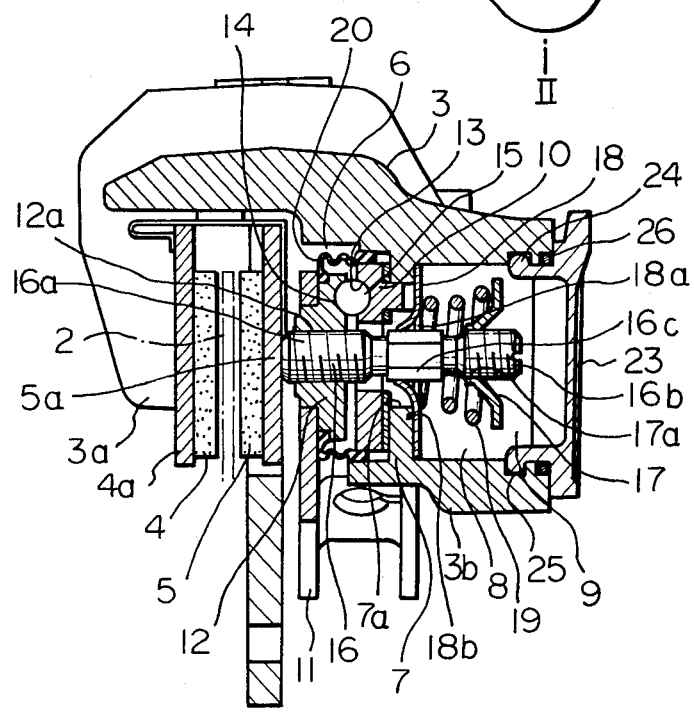
FIG. 2 is a sectional view taken along line II—II in FIG. 1.

The intermediate portion 16c of the rod 16 has a hexagonal or octagonal cross-section. Two opposite flat surfaces of intermediate portion 16c engage legs 18a of a rotation control member 18. The rotation control member 18 is an annular plate engaging the outer surface of the annular wall 7 of the caliper 3, having a lug 18b fitted into an opening in annular wall 7 so as to prevent rotation of the rotation control member 18 relative to the annular wall 7. The rotation control member 18 is pressed against the wall 7 by the coil spring 19. The legs 18a resiliently engage the outer circumference of the rod 16, thereby controlling the rotation of the rod 16. In the initial stage of brake application the force transmitted from the nut 12 to the rod 16 is small and, the rotation of the rod is prevented by the legs 18a. When the brake applying force transmitted from the nut to the rod increases, the rod 16 rotates with the nut 12 and the lever 11 overcoming the resilient force of the legs 18a. However, the angle of the rotation of the rod 16 is usually small so that the legs 18a do not ride over the corners of the polygonal portion 16c, thus, in releasing the brake, the rod 16 returns to its initial angular position. It will be noted that the rotation control member 18 may be omitted by increasing the frictional resistance in the screw-threads between the nut 12 and the rod 16. There is provided a tool receiving recess in the outer end portion 16b of the rod 16. Shown at 20 in FIG. 2 is a dust cover. In the embodiment, the lever 11 and the nut 12 are formed of separate members and are secured together; however, both members may be combined into an integral member.

Figure 3:
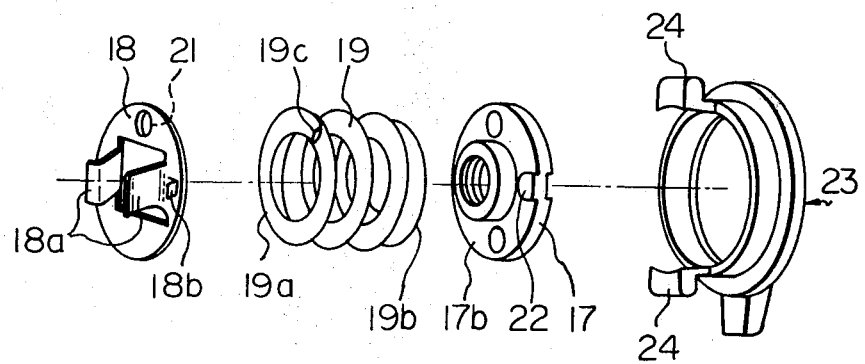
FIG. 3 is a perspective exploded view of the rotation control member, the coil spring and the spring retainer of the disc brake of FIG. 1.
Figure 4:
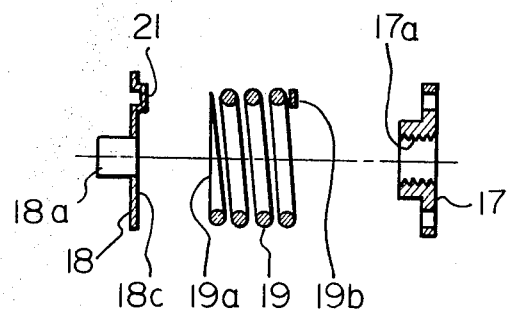
FIG. 4 is a vertical sectional view showing respective parts of FIG. 3.
Figure 5:
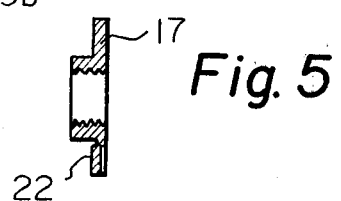
FIG. 5 is horizontal sectional view of the spring retainer shown in FIG. 3.

According to the invention, there are provided on end surface 18c of the rotation control member 18 and on end surface 17b of the spring retainer 17, respectively, projections 21 and 22 to abut respectively in the circumferential direction the coil ends 19c and 19d of the coil spring 19, as illustrated in FIGS. 3, 4, and 5. The opposite end surfaces 19a and 19b of the coil spring 19 engage respectively surfaces 18c and 17b of the rotation control member 18 and the spring retainer 17 which act as the seating surfaces for the coil spring 19. In the embodiment, the direction of the winding in the coil spring 19 is opposite to the direction of screw-threads of the rod 16 (i.e., has opposite pitch); thus, rotation of the spring retainer 17 in the direction disengaging from the rod 16 is prevented by the coil spring 19 with the coil ends 19c and 19d thereof abutting the projections 21 and 22. The projections 21 and 22 may not necessarily engage the coil ends 19c and 19d of the coil spring 19; and the direction of the winding of the coil spring 19 may not necessarily be equal to the disengaging or loosening direction of the spring retainer 17, particularly when the spring force of the spring 19 is relatively large, since the projections 21 and 22 substantially increase the rotational resistance between the end surfaces 19a and 19b of the coil spring 19 and the seating surfaces 18c and 17b, respectively.

As shown in FIG. 3, the cover 23 closing the open end 9 of the recess 8 has fitting lugs 24 and 24' which can resiliently fit with grooves or recesses 25 formed in the peripheral wall of the recess 8.

The operation of the disc brake shown in the drawings will now be explained.

In applying the brake, the lever 11 is rotated in the direction of arrow A in FIG. 1. The nut 12 rotates around the axis of the rod 16 and separates from the ramp plate 10, whereby the friction pad 5 is pressed against the disc 2 by the rod 16 and the caliper 3 moves rightward as viewed in FIG. 2 by the reaction force so that the friction pad 4 is pressed against the disc 2 by the limb portion 3a of the caliper 3.

When the force applied on the lever 11 is released, the spring force of the spring 19 acts on the nut 12 through retainer 17 and rod 16 to approach the ramp plate 10. Thus, the nut 12 and the lever 11 rotate in the direction opposite to the direction of arrow A and the nut 12 approaches the ramp plate 10 and the rod 16 retracts, i.e., moves in the direction separating from the friction pad 5. The friction pads 4 and 5 are released from the disc 2. The rotation of the nut 12 terminates when the balls 15 rollingly move to the deepest portions of the grooves 13 and 14 of the ramp plate 10 and the nut 12.

The opposite end surfaces of the spring 19 engage projections 21 and 22, thereby preventing reliably the rotation of the spring retainer 17 in the loosening direction irrespective of vibrations of the disc brake or the vehicle. Thus, the length of the spring 19 in the axial direction is maintained constant.

When the friction pads 4 and 5 have worn, the cover 23 is removed, and the rod 16 is rotated by inserting a suitable tool such as a screw-driver and overcoming the resilient force of legs 18a. The friction pads 4 and 5 move toward the disc 2, whereby the clearance between the friction pads 4 and 5 and the disc 2 is adjusted. Since the pitch of screw-threads in the opposite end portions 16a and 16b of the rod 16 are equal, the relative position between the nut 12 and the spring retainer 17 and the force of the spring 19 will not change.

In assembling the spring retainer 17 with the rod 16, the end surfaces 19a and 19b of the spring 19 can ride over the projections 21 and 22. Preferably, the axial height of the projections is relatively low so as to minimize the assembling torque applied on the spring retainer 17.

As described heretofore, according to the invention, the rotation of the spring retainer or the displacement thereof in the direction of the axis of the rod is prevented by the return spring, with the opposite ends of the coil thereof engaging with projections provided on seating surfaces; thus, the spring force of the return spring will not change irrespective of vibrations, or the brake clearance adjusting operation. Further, the construction is very simple; the number of parts can be reduced; and the costs can be reduced.

It will be noted that the invention is not limited to the embodiment described as above, and the invention may include the following embodiments.

(a) The coiling direction of the spring 19 may be the same as the direction of screw-threads in the end portion 16b of the rod 16, with the opposite ends of the coil of the spring 19 being bent over in the direction opposite to that of the coil, whereby the bent over ends of the spring 19 can engage projections 21 and 22 to prevent loosening of the spring retainer 17.

(b) The rotation control member 18 may be provided separately from the spring 19 with the seating surface for the spring 19 being defined on the annular wall 7, and a projection corresponding to the projection 21 being provided on the wall 7.

What is claimed is

1. A disc brake comprising:
  a disc, having opposite first and second sides, rotatable about an axis of rotation;
  first and second friction pads respectively disposed on said first and second sides of said disc;
  a stationary member;
  a caliper supported on said stationary member to slide in a direction parallel said axis of rotation, said caliper straddling the circumference of said disc to define first and second limb portions respectively on said first and second sides of said disc, said first limb portion engaging said first friction pad for pressing said second friction pad against said first side of said disc, said second limb portion having an opening therein extending in an axial direction parallel said axis of rotation,
  a threaded rod, threaded with a first pitch, and extending along a line in said axial direction through said opening, one end of said rod abutting said second friction pad;
  force converting means, engaging said second limb portion and threadingly engaging said threaded rod and including means for rotating said rod about said line, for pressing said one end of said rod against said second friction pad to press said second friction pad against said second side of said disc;
  a spring retainer having a seating surface, threadingly engaging said rod so as to be screwably movable along said rod relative to said force converting means;
  a coil spring comprising a coil extending in said axial direction, disposed between said spring retainer and said second limb portion so as to bias said rod in said axial direction away from said second friction pad; and
  a projection provided on said seating surface of said spring retainer for engaging the end of the coil adjacent thereto in the circumferential direction of said coil, to control the rotation of said spring retainer around said rod so as to bias said spring retainer against rotation in a loosening direction.

2. A disc brake as set forth in claim 1 wherein said second limb comprises an annular wall formed in said opening, said disc brake further comprising a rotation control member including an annular portion abutting non-rotatably with said annular wall, a leg extending from said annular portion and resiliently abutting with the outer circumference of said rod to control the rotation of said rod, and an axial projection formed on said annular portion and engaging in the circumferential direction with the other end of said coil.

3. A disc brake as in claim 1, wherein the pitch of said coil is directed oppositely to the direction of said first pitch of said rod.

4. A disc brake as in claim 1, wherein the length of said projection is sufficiently low that in screwing said retainer in a tightening direction opposite said loosening direction, said end of said coil slides over said projection with said coil being gradually compressed.

5. A mechanically operated disc brake comprising:
  a supporting member;
  a caliper slidably supported on said supporting member for sliding movement parallel to the axial direction of a disc to be braked and straddling a peripheral portion of the disc and having limbs extending along opposite sides of the disc;
  a first friction pad engaged by one of said limbs for being urged against one surface of the disc by said one limb;
  a second friction pad opposed to said first friction pad on the other side of the disc;
  the other limb of said caliper having a cavity therein, said cavity having an inner cavity facing toward said first and second friction pads and an outer cavity facing away from said first and second friction pads and an annular wall having an aperture therethrough partitioning said outer cavity from said inner cavity;
  a threaded rod member having an inner end abutting said second friction pad for urging said second friction pad against the disc and an outer end extending through the opening in said annular wall into said outer cavity;
  a nut member rotatably threadingly mounted on said rod member in said inner cavity and having means for applying thereto a rotational input force;
  means in said inner cavity engaged with said nut member for converting rotational movement of said nut member into axial movement thereof;
  a spring retainer having a seating surface, threadingly engaging said rod member so as to be screwably movable along said rod member relative to said nut member;
  a coil spring comprising an axially extending coil disposed between said spring retainer and said annular wall so as to bias said rod member in said axial direction away from said second friction pad;
  a projection provided on said seating surface of said spring retainer for engaging the end of said coil adjacent thereto in the circumferential direction of said coil, to control the rotation of said spring retainer around said rod member so as to bias said spring retainer against rotation in a loosening direction; and
  a rotation control member fixed in said outer cavity contiguous to said annular wall and non-rotatably fixed therein and having at least one leg portion engaging the outer peripheral surface of said rod member for restricting the rotation thereof.

* * * * *